US012773709B2

(12) United States Patent
Critchett et al.

(10) Patent No.: US 12,773,709 B2
(45) Date of Patent: Oct. 27, 2026

(54) SOLVENT PUSH FLOATING PISTON

(71) Applicant: FANUC AMERICA CORPORATION, Rochester Hills, MI (US)

(72) Inventors: Alexandra Critchett, Shelby Township, MI (US); Ernest M. Otani, Waterford, MI (US); Douglas Waineo, Bloomfield Hills, MI (US)

(73) Assignee: FANUC America Corporation, Rochester Hills, MI (US)

( * ) Notice: Subject to any disclaimer, the term of this patent is extended or adjusted under 35 U.S.C. 154(b) by 455 days.

(21) Appl. No.: 18/486,514

(22) Filed: Oct. 13, 2023

(65) Prior Publication Data

US 2025/0121394 A1 Apr. 17, 2025

(51) Int. Cl.
*B05B 15/55* (2018.01)
*B05B 13/04* (2006.01)
*B25J 11/00* (2006.01)

(52) U.S. Cl.
CPC .......... *B05B 15/55* (2018.02); *B05B 13/0431* (2013.01); *B25J 11/0075* (2013.01)

(58) Field of Classification Search
None
See application file for complete search history.

(56) References Cited

U.S. PATENT DOCUMENTS

| | | | | | | |
|---|---|---|---|---|---|---|
| 1,763,866 | A | * | 6/1930 | Rodd | B41D 1/00 | 141/183 |
| 2,162,144 | A | * | 6/1939 | Waugh | B65B 3/32 | 417/318 |
| 2,308,408 | A | * | 1/1943 | Wall | F16K 11/163 | 137/111 |
| 2,825,190 | A | * | 3/1958 | Heald | B65B 3/24 | 141/69 |
| 2,957,448 | A | * | 10/1960 | Dynia | B05C 1/10 | 118/259 |
| 3,024,869 | A | * | 3/1962 | Akamatsu | F16N 25/02 | 184/7.4 |

(Continued)

FOREIGN PATENT DOCUMENTS

| | | | |
|---|---|---|---|
| EP | 2269741 | A1 | 1/2011 |
| EP | 2678114 | B1 | 5/2017 |

(Continued)

*Primary Examiner* — Jethro M. Pence
(74) *Attorney, Agent, or Firm* — John A. Miller; Shumaker, Loop & Kendrick, LLP

(57) ABSTRACT

A system for dispensing paint including a canister manifold having a paint input valve, a paint output valve, a push valve and a solvent input/output line. The system also includes a paint canister coupled to the canister manifold that includes a driven piston and a floating piston defining a paint volume therebetween, and a solvent volume between the floating piston and the canister manifold. The solvent input/output line is in fluid communication with the solvent volume and the push valve. The driven piston is actuated to push paint from the paint volume through a paint output line when the paint output valve is open and the push valve is closed and push the floating piston to push solvent from the solvent volume through the solvent input/output line when the push valve is open.

20 Claims, 4 Drawing Sheets

(56) References Cited

U.S. PATENT DOCUMENTS

| | | | | | |
|---|---|---|---|---|---|
| 3,321,110 | A * | 5/1967 | Price | B05B 9/0838 92/174 |
| 3,403,695 | A * | 10/1968 | Hopkins | B05B 12/149 239/335 |
| 3,403,818 | A * | 10/1968 | Enssle | B05B 9/0838 222/23 |
| 3,662,953 | A * | 5/1972 | Wiens | E01C 19/174 239/159 |
| 3,691,834 | A * | 9/1972 | De Fasselle | G01F 1/22 73/861.54 |
| 3,734,648 | A * | 5/1973 | Nielson | A61M 60/462 417/310 |
| 3,830,509 | A * | 8/1974 | Weber | B23B 31/305 242/571.1 |
| 4,197,884 | A * | 4/1980 | Maran | B65D 83/42 141/113 |
| 4,881,563 | A * | 11/1989 | Christian | B05B 15/55 239/311 |
| 5,293,911 | A * | 3/1994 | Akeel | G01D 5/06 141/354 |
| 5,635,630 | A * | 6/1997 | Dawson | F02M 25/0818 123/518 |
| 6,164,561 | A | 12/2000 | Yoshida et al. | |
| 6,179,217 | B1 | 1/2001 | Yoshida et al. | |
| 6,390,386 | B2 * | 5/2002 | Krohn | B05B 15/16 239/71 |
| 6,612,345 | B1 | 9/2003 | Hosoda et al. | |
| 6,705,545 | B1 * | 3/2004 | Sroka | B05B 12/14 239/311 |
| 6,742,722 | B2 | 6/2004 | Hosoda et al. | |
| 8,007,872 | B2 | 8/2011 | Nakazono et al. | |
| 8,020,784 | B2 | 9/2011 | Baumann et al. | |
| 8,042,579 | B2 | 10/2011 | Matsumoto | |
| 8,146,840 | B2 | 4/2012 | Nakazono et al. | |
| 8,322,301 | B2 | 12/2012 | Nakazono et al. | |
| 8,434,702 | B2 | 5/2013 | Mori et al. | |
| 9,713,816 | B2 | 7/2017 | Robert | |
| 9,901,945 | B2 * | 2/2018 | Fehr | F04B 7/02 |
| 10,072,722 | B2 * | 9/2018 | Bandy | F16F 9/067 |
| 10,533,622 | B2 * | 1/2020 | Bandy | F16F 9/067 |
| 11,045,830 | B2 * | 6/2021 | Fehr | F04B 49/065 |
| 11,478,811 | B2 | 10/2022 | Kuniharu et al. | |
| 12,318,796 | B2 * | 6/2025 | Bachman | B05B 15/52 |
| 12,318,801 | B2 * | 6/2025 | Kulkarni | B05B 1/14 |
| 12,465,944 | B2 * | 11/2025 | Wehler | B05B 1/044 |
| 2005/0098213 | A1 * | 5/2005 | Knowles | F16L 37/36 62/50.7 |
| 2006/0043102 | A1 * | 3/2006 | Keller | B29C 66/9241 222/1 |
| 2011/0014384 | A1 * | 1/2011 | Simmons | B05B 9/0838 222/206 |
| 2016/0309966 | A1 * | 10/2016 | Ciavarella | A47K 5/1211 |
| 2016/0337003 | A1 | 11/2016 | Thomas | |
| 2021/0394217 | A1 * | 12/2021 | Chevron | B05B 13/0431 |
| 2022/0401986 | A1 * | 12/2022 | Andersson | B05B 7/0483 |
| 2024/0160119 | A1 * | 5/2024 | Hong | B05B 1/16 |
| 2024/0343037 | A1 * | 10/2024 | Kida | B41J 2/04581 |
| 2024/0359201 | A1 * | 10/2024 | Mann | B05B 9/0416 |
| 2025/0153484 | A1 * | 5/2025 | Togo | B05B 12/006 |

FOREIGN PATENT DOCUMENTS

| | | | |
|---|---|---|---|
| JP | 2791599 | B2 | 8/1998 |
| JP | 2006082063 | A | 3/2006 |
| JP | 4235631 | B2 | 3/2009 |
| JP | 4755606 | B2 | 8/2011 |
| WO | 200399455 | A1 | 12/2003 |
| WO | 2006001123 | A1 | 1/2006 |

* cited by examiner

SOLVENT PUSH FLOATING PISTON

BACKGROUND

Field

This disclosure relates generally to a fluid dispensing system and, more particularly, to a paint dispensing system including a paint canister having a driven piston and a floating piston defining a paint volume therebetween, where actuation of the driven piston first dispenses paint from the paint volume and then dispenses solvent from a solvent volume in the canister.

Discussion of the Related Art

A typical painting station for painting the exterior surfaces of a vehicle body in both a continuous conveyance and stop station systems includes a spray booth, a plurality of painting robots and opener/closer robots disposed on a periphery thereof. These robots can be mounted on the floor, the wall, the ceiling or side rails. The painting robots typically includes a spray gun or rotary applicator for directing atomized paint onto the vehicle body. The spray booth includes sophisticated environmental and air handling equipment that treats and exhausts the vapor-laden air from the spray booth, and prevents the paint vapors from entering an operator aisle where people are present.

For a certain type of painting robot and for a particular painting job, paint of a certain color is loaded into a paint canister through a valve and manifold system. The paint canister is in fluid communication with a paint applicator through a hose and valve system. During the painting operation, a piston pushes the paint out of the canister through the hose to the applicator to be sprayed onto the vehicle body, or other part. The paint canister can be located at various locations, both inside and outside of the spray booth, including on an arm of the robot. Thus, the length of the hose coupling the paint canister to the applicator can vary from design to design.

Vehicle paint is expensive, and therefore efforts are made to limit paint waste. The amount of paint that is loaded into the paint canister is carefully controlled and metered by software for a particular painting job. When the desired amount of paint is sprayed onto the vehicle body, the canister should be empty. However, there is still paint in the hose between the paint canister and the applicator that is unused and wasted, which is costly.

SUMMARY

The following discussion discloses and describes a paint dispensing system including a paint applicator and a canister manifold having a paint input valve, a paint output valve, a push valve and a solvent input/output valve. The system further includes a paint canister coupled to the canister manifold and having a chamber therein, where the paint canister includes a driven piston and a floating piston positioned within the chamber and defining a paint volume therebetween. The paint canister further includes a solvent volume in the chamber between the floating piston and the canister manifold, a paint input line extending through the floating piston and being in fluid communication with the paint volume and the paint input valve, and a paint output line extending through the floating piston and being in fluid communication with the paint volume and the paint output valve, where the solvent input/output line is in fluid communication with the solvent volume and the push valve. A paint dispensing line is coupled to the applicator and the canister manifold. The driven piston is actuated to push paint from the paint volume through the paint output line and through the paint dispensing line to the applicator when the paint output valve is open and the push valve is closed and push the floating piston to push solvent from the solvent volume through the solvent input/output line and push paint through the paint dispensing line to the applicator when the push valve is open.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a paint dispensing system including a paint canister having a driven piston and a floating piston defining a paint volume therebetween, where actuation of the driven piston first dispenses paint from the paint volume and then solvent from a solvent volume in the canister, is exemplary in nature, and is in no way intended to limit the invention or its applications or uses. For example, although the discussion herein is specific to a paint dispensing system for a painting robot that paints a vehicle part, the paint dispensing system may have application for dispensing other coatings or fluids by other devices for other applications.

Figure 1:
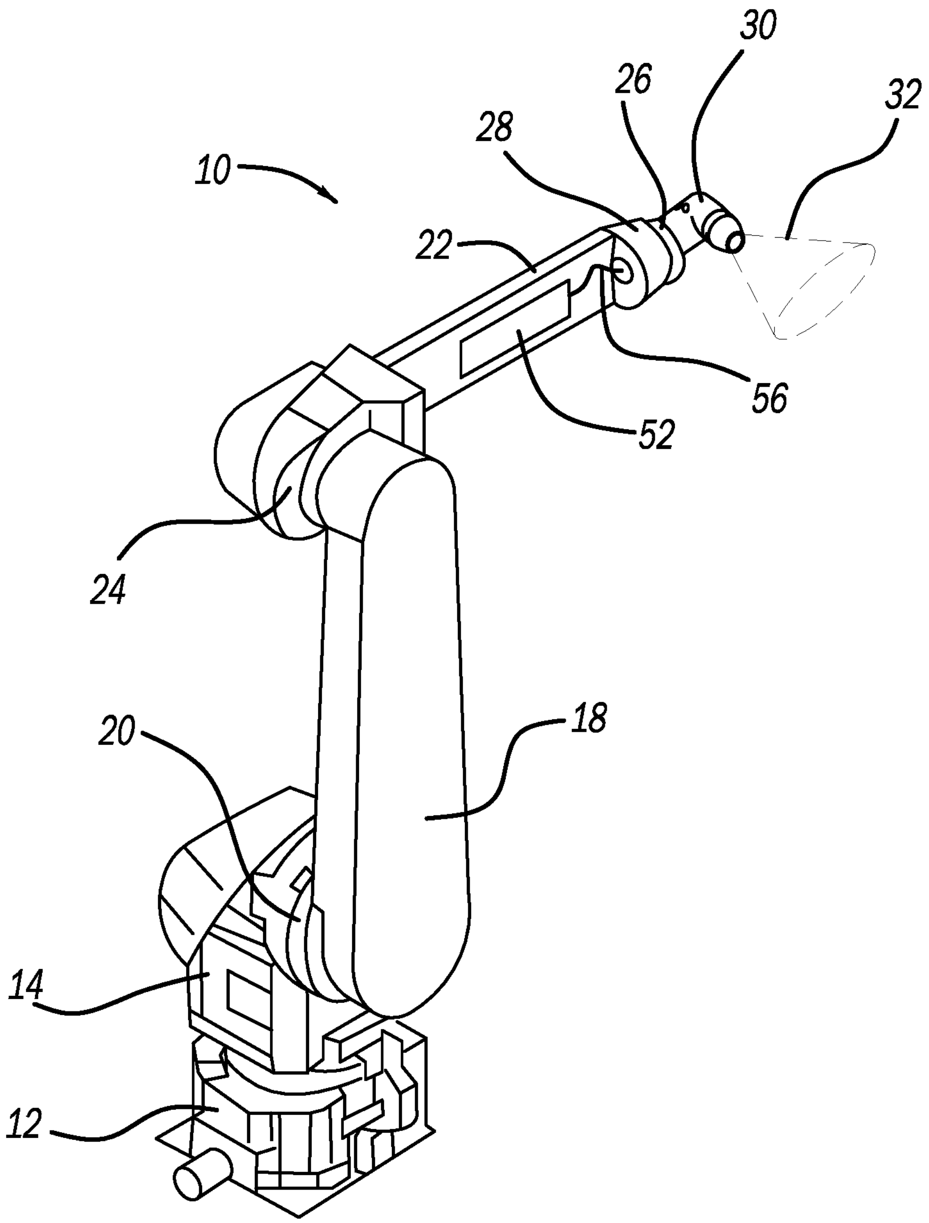
FIG. 1 is an isometric view of a painting robot.

FIG. 1 is an isometric view of a painting robot 10 mounted to a fixed base mounting stand 12, where the robot 10 is intended to represent any painting robot suitable for the purposes discussed herein. A turret or robot base 14 is rotatably mounted to the mounting stand 12. An inner arm 18 is rotatably coupled to the base 14 by a joint 20, an outer arm 22 is rotatably coupled to the inner arm 18 by a joint 24, and a wrist member 26 is rotatably coupled to the outer arm 22 by a joint 28. An applicator 30 is fixedly attached to the wrist member 26 at an angle optimized for a painting application, where paint spray 32 is shown being emitted from the applicator 30.

Figure 2:
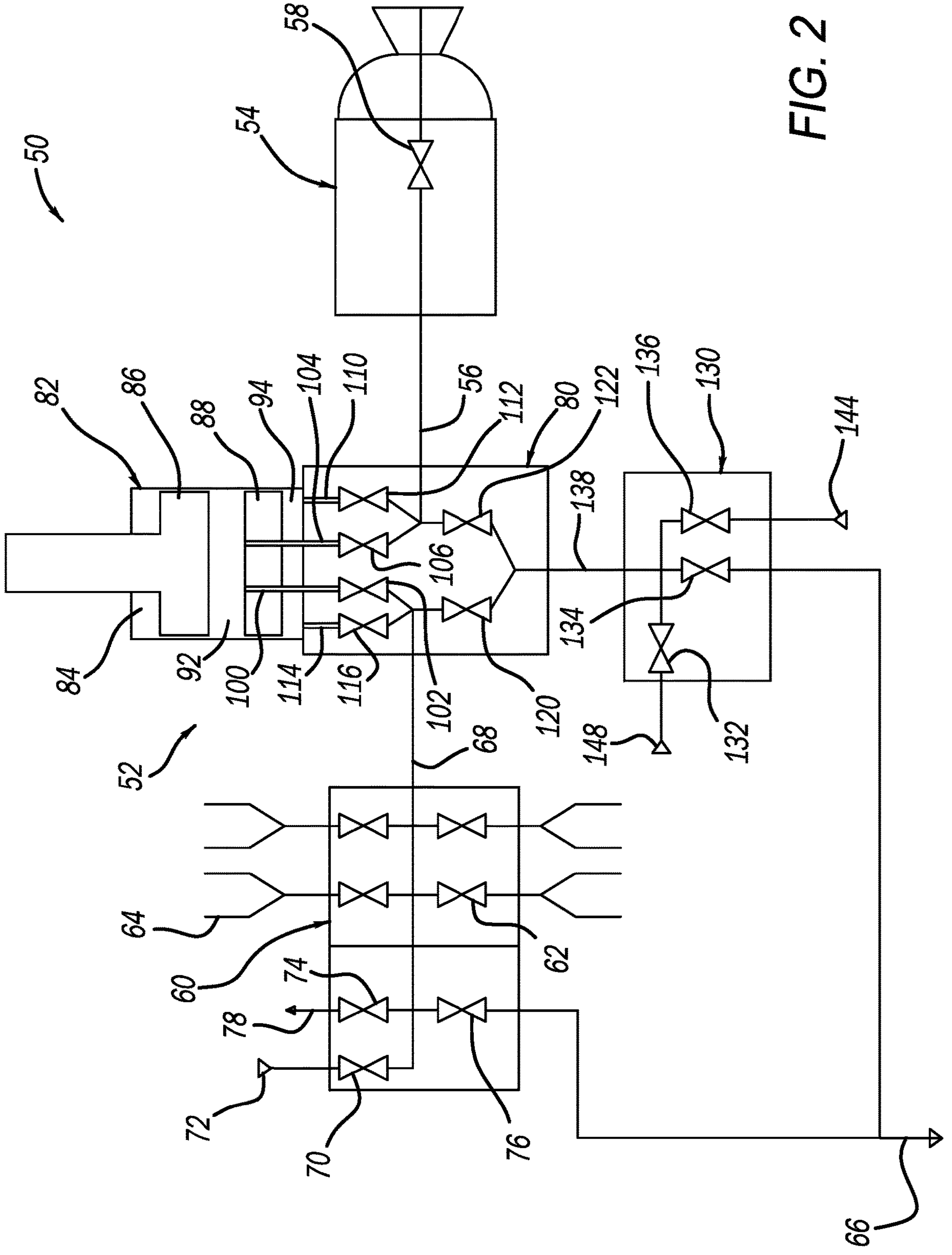
FIG. 2 is a schematic type diagram of a paint dispensing system that can be used with the painting robot shown in FIG. 1.

FIG. 2 is a schematic type block diagram of a paint dispensing system 50 that can be used with the painting robot 10 shown in FIG. 1. It is noted that although the discussion herein is specific to a painting robot that paints, for example, a vehicle body, the paint dispensing system 50 may have application for dispensing other coatings or fluids by other devices for other applications. The system 50 includes a dispensing sub-system 52 and an applicator 54, such as the applicator 30, for example, a rotary atomizer, having a trigger valve 58, that are connected by a paint dispensing line 56. The dispensing sub-system 52 may be mounted to the outer arm 22 of the robot 10 (see FIG. 1), where the paint sources 64, the solvent source 72 and solvent source 144 would be provided at another location and plumbed to the sub-system 52. The applicator 54 would be part of an end-effector on the robot 10 and be positioned within the spray booth.

The dispensing sub-system 52 includes a paint manifold 60 having a plurality of color valves 62 that are selectively opened to obtain paint from a plurality of paint sources 64 and provide the paint to an isolation line 68. The paint manifold 60 also includes a solvent valve 70 that is selectively opened to provide solvent on the isolation line 68 from a solvent source 72. The paint manifold 60 also includes a dump valve 74 for releasing solvent and air from the dispensing sub-system 52 to a dump outlet 78. The paint manifold 60 includes a vacuum valve 76 coupled to a vacuum source for evacuating air from the passages before they fill with paint.

The dispensing sub-system 52 further includes a canister manifold 80 having a paint canister 82 attached thereto, where the canister 82 includes a chamber 84. The canister 82 also includes a driven piston 86 and a floating piston 88 defining a paint volume 92 in the chamber 84 therebetween, which holds a predetermine volume of paint when the canister 82 is loaded with paint. The driven piston 86 can be motor driven, pneumatically driven, fluid driven, etc. A solvent volume 94 is provided in the chamber 84 between the floating piston 88 and the manifold 80, which holds a volume of solvent, as will be discussed in detail below. A paint input line 100 allows the volume 92 to be filled with paint from the isolation line 68 through a paint input valve 102 and a paint output line 104 allows paint to be dispensed from the paint volume 92 by movement of the piston 86 into the paint dispensing line 56 through a paint outlet valve 106, where the lines 100 and 104 are rigidly attached to the floating piston 88. A solvent input/output line 110 allows the volume 94 to be filled with the solvent through a push valve 112 and allows the solvent in the volume 94 to be pushed into the paint dispensing line 56 to push paint therein into the applicator 54 when the paint volume 92 is empty or near empty, where the driven piston 86 pushes the floating piston 88 to force the solvent out of the volume 94. When the volume 94 is being filled with solvent through the line 110, air is removed therefrom through a purge line 114 and a purge valve 116, and then through the isolation line 68 to the dump outlet 78. A pair of valves 120 and 122 in the manifold 80 allow the various lines in the manifold 80 to be cleaned with solvent and dried, as will be described in further detail below.

The dispensing sub-system 52 also includes a cleaning manifold 130 having valves 132, 134 and 136 that are coupled to the valves 120 and 122 in the manifold 80 by an isolation line 138. The valve 134 is a vacuum valve that is used for evacuating air from the lines before being filled with paint. A solvent source 144 provides solvent to the manifold 130 through the valve 136. An air source 148 provides drying air to the manifold 130 through the valve 132. The paint canister 82 and the applicator 54 are at high voltage and the paint manifold 60 and the cleaning manifold 130 are grounded by a fluid supply during the painting operation. Therefore, the canister 82 must be electrically isolated from the paint manifold 60 and the cleaning manifold 130 to prevent ground faults. The isolation lines 68 and 138 are therefore empty and clean during the painting operation to provide the electrical isolation.

The various valves and devices described above are suitably controlled to provide the following operations. When the paint volume 92 is full of paint, the solvent volume 94 is full of solvent and the painting procedure is ready to proceed, the driven piston 86 is actuated and the valve 106 is properly controlled to dispense paint into the paint line 56 to be sprayed onto the vehicle body by the applicator 54. The push valve 112 is closed and thus the floating piston 88 does not move. When the paint volume 92 is near empty, the valve 106 is closed and the push valve 112 is, for example, pneumatically actuated through software control, where the valve opening timing can be based on the torque sensed by the driven piston 86, pressure in the canister 82, the properties of the paint and solvent, the paint flow rate, the total paint required and/or other process parameters. The control of the push valve 112 is adjustable and can be input directly or obtained from a lookup table. When the push valve 112 opens, the floating piston 88 is pushed downward by the driven piston 86 so that solvent is dispensed into the paint line 56 to push the paint in the line 56 into the applicator 54. The lines 100 and 104 move into the manifold 80 through suitable seals as the piston 88 moves downward. When the solvent volume 94 becomes empty, most of the paint dispensing line 56 is filled with solvent and the painting operation is stopped.

In one possible configuration, after the dispense sequence described above is completed, the dispensing sub-system 52 starts preparing for the next painting operation. The driven piston 86 is backed up a small amount from the floating piston 88. Solvent from the solvent source 144 is pushed into the solvent volume 94 through the valves 136, 122 and 112, and air is flushed out of the solvent volume 94 through the purge valve 116 to the dump outlet 78. The dump outlet 78 is closed and the solvent from the source 144 fills the solvent volume 94. After the solvent volume 94 is filled, solvent from the source 144 and air from the source 148 are used to clean the paint volume 92 out to the dump outlet 78. The paint volume 92 and the isolation line 68 are then dried. Vacuum is pulled from the isolation line 68 and the paint volume 92 to remove air before filling the volume 92 with paint. The volume 92 is then filled with paint from one of the paint sources 64. The excess paint in the isolation line 68 is then pushed into the paint volume 92 with solvent from the solvent source 72. The paint line 56 is then filled from the volume 92 and the isolation lines 68 and 138 are cleaned and dried.

The configuration of the paint canister 82 offers a number of advantages. The isolated paint and solvent volumes 92 and 94 are controlled by a single drive, such as a ball screw and motor. Since the paint and solvent volumes 92 and 94 are in the same canister 82 on opposite sides of the floating piston 88, equal and opposite forces are exerted on the piston 88 and the pressure in the volumes 92 and 94 is similar. The solvent push valve 112 can be pneumatically actuated based on I/O from a controller. The timing of opening the push valve 112 and starting the solvent push sequence can be adjusted based on the pressure in the canister 82, the driven piston motor torque, the canister position, the flow rate, the properties of the paint and solvent used, total paint required, or any other parameter. Thus, the actuation of the valve 112 is not limited to being open just based on position. The push valve 112 can open before the pistons 86 and 88 collide, allowing the floating piston 88 to start motion before the driven piston 86 touches it. The push valve 112 is accessible without removing the canister 82 from the manifold 80 or the driven piston 86. The push valve 112 can be easily accessed and serviced outside of the manifold 80. Since the floating piston 88 is connected to the canister manifold 80, it only travels the distance needed to push the paint dispensing line 56 to the applicator 54, i.e., less than 10 mm instead of hundreds of mm. The solvent volume 94 is static while dispensing paint from the paint volume 92 until the push valve 112 opens. The inlet and outlet to the solvent volume 94 are static and therefore there is not a hose or tube connection that must bend or flex inside of the chamber 84 and move the full travel of the canister 82.

Figure 3:
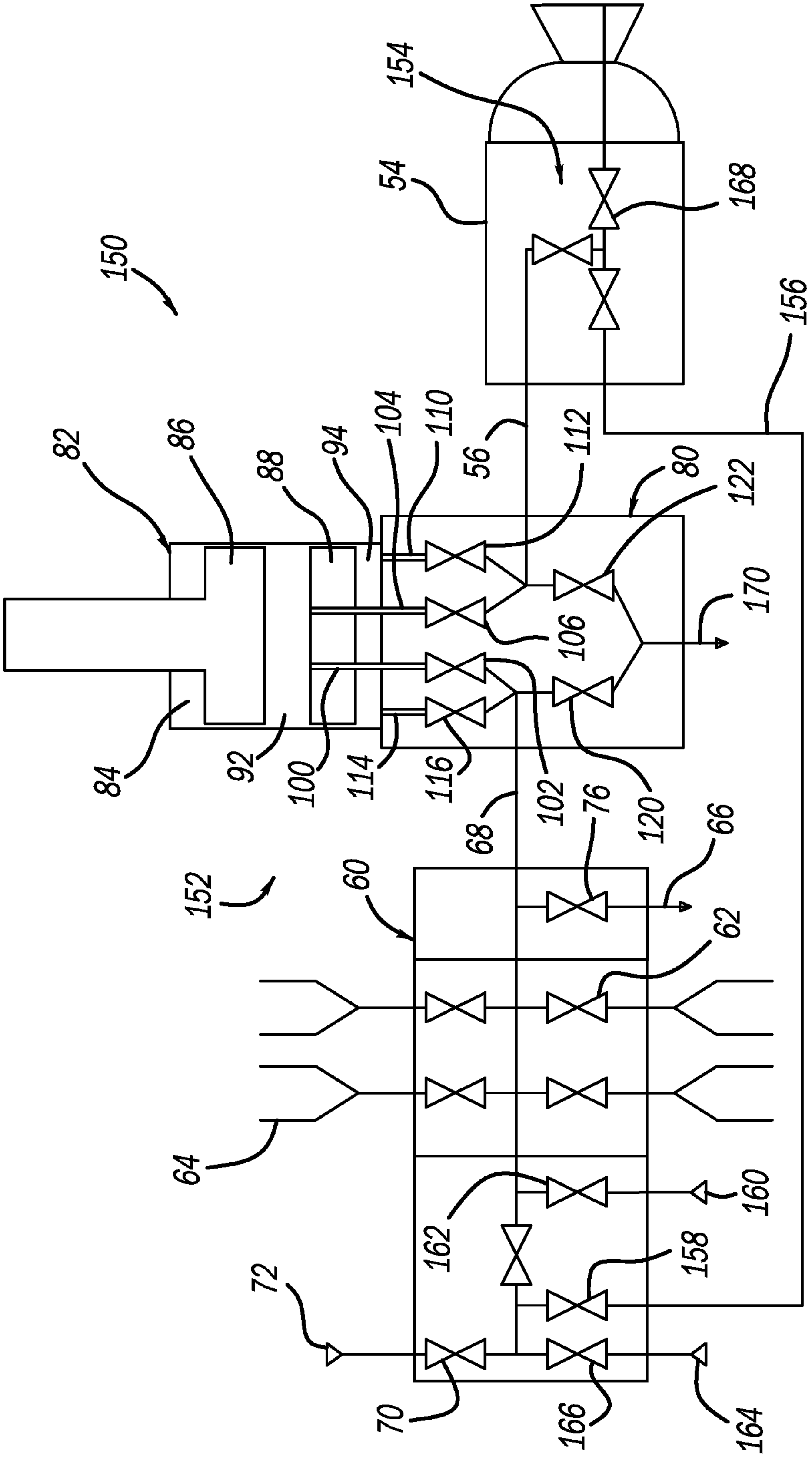
FIG. 3 is a schematic type diagram of another paint dispensing system that can be used with the painting robot shown in FIG. 1.

Various other designs of the dispensing sub-system can be employed in connection with the canister manifold 80 and the paint canister 82. FIG. 3 is a schematic type block diagram of a paint dispensing system 150 including a dispensing sub-system 152 that can be used with the painting robot 10 shown in FIG. 1, where like elements to the system 50 have the same reference number. In this embodiment, the cleaning manifold 130 is eliminated and a paint line flush valve 158 is coupled to the applicator 54. The line 156 brings solvent to the applicator 54 to clean the paint line 56 through a dump isolation line 170. The design of the paint manifold 60 is slightly different from the dispensing system 52. Particularly, a second solvent source 160 is coupled to the paint manifold 60 through a valve 162 and an air source 164 is coupled to the paint manifold 60 through a valve 166. The operation of the canister manifold 80 and the paint canister 82 is basically the same as the paint dispensing system 50 as discussed above; however, the canister manifold 80 has a dump outlet attached to it through the dump isolation line 170 to allow the paint line 56 to be flushed without sending paint out of an applicator trigger valve 168.

Figure 4:
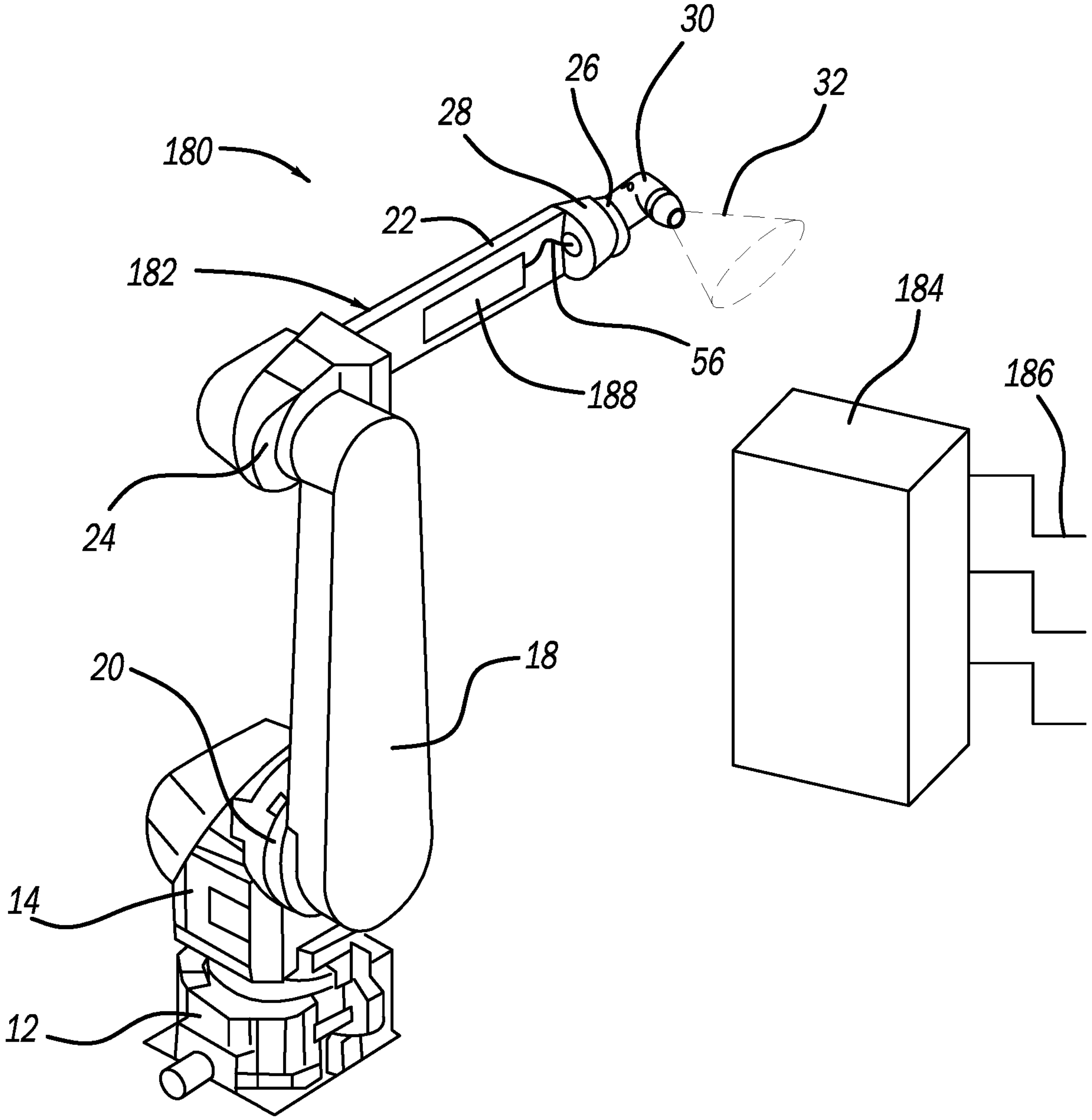
FIG. 4 is an isometric view of a robot system including a painting robot and a docking station.

For the discussion above, the source of fluids, specifically the paint and solvent, are plumbed to the robot 10. In an alternate embodiment, other techniques for providing the paint and solvent can be employed. FIG. 4 is an isometric view of a robot system 180 including a robot 182 and a docking station 184 that receives the various fluids on fluid supply lines 186 from a suitable source, where like elements to the robot 10 are identified by the same reference number. In this embodiment, the robot 182 includes a dispensing sub-system 188 that does not include the paint manifold as discussed above, where the paint manifold of the type discussed above would be on the docking station 184, and thus the isolation line 68 is eliminated. The robot 182 is equipped and configured to dock to the docking station 184 so that the paint and solvent can be provided to the canister manifold 80 that is on the robot 182.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A system for dispensing a fluid, said system comprising:

a canister manifold including a fluid input valve, a fluid output valve, a push valve and a solvent input/output line; and a fluid canister coupled to the canister manifold and having a chamber therein, said fluid canister including a driven piston and a floating piston positioned within the chamber and defining a fluid volume therebetween, said fluid canister further including a solvent volume in the chamber between the floating piston and the canister manifold, a fluid input line extending through the floating piston and being in fluid communication with the fluid volume and the fluid input valve, and a fluid output line extending through the floating piston and being in fluid communication with the fluid volume and the fluid output valve, wherein the solvent input/output line is in fluid communication with the solvent volume and the push valve, and wherein the driven piston is actuated to push the fluid from the fluid volume through the fluid output line when the fluid output valve is open and the push valve is closed and push the floating piston to push solvent from the solvent volume through the solvent input/output line when the push valve is open.

2. The system according to claim 1 further comprising a fluid applicator and a fluid dispensing line coupled to the applicator and the canister manifold, wherein the fluid is pushed through the fluid dispensing line to the applicator when the driven piston is actuated to push the fluid from the fluid volume and the fluid is pushed through the fluid dispensing line to the applicator when the driven piston is actuated to push the floating piston and push solvent from the solvent volume to the applicator.

3. The system according to claim 1 wherein the fluid input line and the fluid output line are rigidly coupled to the floating piston, and wherein the fluid input line and the fluid output line are pushed into the canister manifold when the floating piston is pushed by the driven piston.

4. The system according to claim 1 wherein the canister manifold further includes a purge valve and a purge line in fluid communication with the solvent volume, and wherein the purge line and the purge valve allow air to be removed from the solvent volume when the solvent volume is being filled with solvent through the solvent input/output line.

5. The system according to claim 1 further comprising a fluid supply manifold, a plurality of sources of different fluids coupled to the fluid supply manifold, an isolation line coupled to the fluid supply manifold and the canister manifold and a source of solvent coupled to the fluid supply manifold, said fluid supply manifold including a plurality of valves that are controlled to provide solvent from the source of solvent and provide the fluid to the canister manifold.

6. The system according to claim 5 wherein the isolation line is empty when the fluid canister is dispensing the fluid so as to electrically isolate the fluid supply manifold from the canister manifold.

7. The system according to claim 1 wherein the push valve is actively controlled by software and has a valve opening time that is based on one or more of torque sensed by the driven piston, canister position, properties of the fluid and solvent, fluid flow rate, dispense pressure and total fluid required.

8. The system according to claim 1 wherein the system further includes a vacuum source in fluid communication with the fluid volume for evacuating air from the fluid volume.

9. The system according to claim 1 wherein the fluid is paint and the system is part of a painting robot.

10. A robot system including a painting robot and a paint dispensing system, said paint dispensing system comprising:

a paint applicator;

a canister manifold including a paint input valve, a paint output valve, a push valve and a solvent input/output line;

a paint canister coupled to the canister manifold and having a chamber therein, said paint canister including a driven piston and a floating piston positioned within the chamber and defining a paint volume therebetween, said paint canister further including a solvent volume in the chamber between the floating piston and the canister manifold, a paint input line extending through the floating piston and being in fluid communication with the paint volume and the paint input valve, and a paint output line extending through the floating piston and being in fluid communication with the paint volume and the paint output valve, wherein the solvent input/output line is in fluid communication with the solvent volume and the push valve; and a paint dispensing line coupled to the applicator and the canister manifold, wherein the driven piston is actuated to push paint from the paint volume through the paint output line and through the paint dispensing line to the applicator when the paint output valve is open and the push valve is closed and push the floating piston to push solvent from the solvent volume through the solvent input/output line and push paint through the paint dispensing line to the applicator when the push valve is open.

11. The robot system according to claim 10 wherein the paint input line and the paint output line are rigidly coupled to the floating piston, and wherein the paint input line and the paint output line are pushed into the canister manifold when the floating piston is pushed by the driven piston.

12. The robot system according to claim 10 wherein the canister manifold further includes a purge valve and a purge line in fluid communication with the solvent volume, and wherein the purge line and the purge valve allow air to be removed from the solvent volume when the solvent volume is being filled with solvent through the solvent input/output line.

13. The robot system according to claim 11 wherein the paint dispensing system further includes a paint manifold, a plurality of sources of paint of different colors coupled to the paint manifold, a paint isolation line coupled to the paint manifold and the canister manifold and a first source of solvent coupled to the paint manifold, said paint manifold including a plurality of valves that are controlled to provide solvent from the first source of solvent and provide paint to the canister manifold.

14. The robot system according to claim 13 wherein the paint dispensing system further includes a cleaning manifold, a cleaning isolation line coupled to the canister manifold and the cleaning manifold and a second source of solvent coupled to the cleaning manifold, said cleaning manifold including a plurality of valves that are configured to provide solvent from the second source of solvent to the solvent volume.

15. The robot system according to claim 14 wherein the plurality of valves in the cleaning manifold are also configured to deliver solvent for cleaning the paint dispensing line and the paint isolation line.

16. The robot system according to claim 14 wherein the isolation lines are empty when the paint canister is dispensing paint so as to electrically isolate the paint manifold and the cleaning manifold from the canister manifold.

17. The robot system according to claim 10 further including a docking station and a plurality of sources of different fluids providing fluids to the docking station, said docking station being operably coupled to the paint dispensing system to provide paint and solvents thereto.

18. The robot system according to claim 10 wherein the paint dispensing system further includes a vacuum source in fluid communication with the paint volume for evacuating air from the paint volume.

19. The robot system according to claim 10 wherein the push valve is actively controlled by software and has a valve opening time that is based on one or more of torque sensed by the driven piston, canister position, properties of the paint and solvent, fluid flow rate, dispense pressure and total paint required.

20. A system for dispensing paint, said system comprising:

a canister manifold including a paint input valve, a paint output valve, a push valve and a solvent input/output line;

a paint canister coupled to the canister manifold and having a chamber therein, said paint canister including a driven piston and a floating piston positioned within the chamber and defining a paint volume therebetween, said paint canister further including a solvent volume in the chamber between the floating piston and the canister manifold, a paint input line extending through the floating piston and being in fluid communication with the paint volume and the paint input valve, and a paint output line extending through the floating piston and being in fluid communication with the paint volume and the paint output valve, wherein the solvent input/output line is in fluid communication with the solvent volume and the push valve, and wherein the driven piston is actuated to push paint from the paint volume through the paint output line when the paint output valve is open and the push valve is closed and push the floating piston to push solvent from the solvent volume through the solvent input/output line when the push valve is open; and a paint applicator and a paint dispensing line coupled to the applicator and the canister manifold, wherein the paint is pushed through the paint dispensing line to the applicator when the driven piston is actuated to push the paint from the paint volume and the paint is pushed through the paint dispensing line to the applicator when the driven piston is actuated to push the floating piston and push solvent from the solvent volume.

* * * * *